United States Patent
Wolff

(10) Patent No.: US 9,322,493 B2
(45) Date of Patent: Apr. 26, 2016

(54) CABLE FASTENER WITH HOOK STRUCTURE FOR SUPPORTING A CABLE

(71) Applicant: Mark R. Wolff, Kodak, TN (US)

(72) Inventor: Mark R. Wolff, Kodak, TN (US)

(*) Notice: Subject to any disclaimer, the term of this patent is extended or adjusted under 35 U.S.C. 154(b) by 0 days.

(21) Appl. No.: 14/245,715

(22) Filed: Apr. 4, 2014

(65) Prior Publication Data

US 2014/0299719 A1 Oct. 9, 2014

Related U.S. Application Data

(60) Provisional application No. 61/809,757, filed on Apr. 8, 2013.

(51) Int. Cl.
| | |
|---|---|
| *F16L 3/06* | (2006.01) |
| *F16L 3/13* | (2006.01) |
| *F16L 3/22* | (2006.01) |
| *F16L 3/12* | (2006.01) |
| *H02G 3/32* | (2006.01) |

(52) U.S. Cl.
CPC . *F16L 3/221* (2013.01); *F16L 3/06* (2013.01); *F16L 3/1218* (2013.01); *F16L 3/13* (2013.01); *H02G 3/32* (2013.01)

(58) Field of Classification Search
CPC ............. F16L 3/04; F16L 3/06; F16L 3/127; F16L 3/13; F16L 3/227; F16L 3/1218
USPC ............. 248/71; 24/130, 131 R, 458; D8/356
See application file for complete search history.

(56) References Cited

U.S. PATENT DOCUMENTS

| | | | |
|---|---|---|---|
| D23,321 S | * | 5/1894 | Hoffmann ...................... D32/60 |
| 1,518,900 A | | 12/1924 | Colbert |
| 1,610,082 A | | 12/1926 | Francis |
| 1,736,707 A | | 11/1929 | Lake |
| 1,953,860 A | | 4/1934 | Kraatz |
| 2,043,716 A | | 6/1936 | Sloan |
| 2,188,084 A | | 1/1940 | Kuckuck |
| 2,257,640 A | | 9/1941 | Muller |
| 2,307,348 A | | 1/1943 | Anderson |
| 2,453,980 A | * | 11/1948 | Hartman ................... F16L 3/13 248/68.1 |
| 3,861,631 A | | 1/1975 | Shorin |
| 3,934,802 A | | 1/1976 | Jennings |
| 4,655,423 A | | 4/1987 | Schavilje et al. |
| 5,090,645 A | | 2/1992 | Zuercher |
| 5,207,404 A | | 5/1993 | Reinhard |

(Continued)

FOREIGN PATENT DOCUMENTS

| | | | | |
|---|---|---|---|---|
| EP | 0567017 | * | 4/1993 | ................ F16L 3/13 |
| EP | 1850045 | * | 10/2007 | ................ F16L 3/04 |

(Continued)

*Primary Examiner* — Michael Safavi
(74) *Attorney, Agent, or Firm* — Pitts & Lake, P.C.

(57) ABSTRACT

A cable support for securing at least one cable along a surface is disclosed. The cable support comprises a central shaft portion having a forward end configured to be secured to the surface and a rearward end configured to extend from the surface. A stop is disposed along the central shaft, the stop being sized and shaped to contact the surface and limit advancement of the forward end into the surface. At least one hook structure extends from the central shaft portion rearward end and curves toward the central shaft portion forward end. The hook structure terminates sufficiently rearward of the stop that at least one cable may be received between the hook structure and the surface when the stop contacts the surface.

4 Claims, 4 Drawing Sheets

(56) References Cited

U.S. PATENT DOCUMENTS

| | | |
|---|---|---|
| 6,918,222 B2 | 7/2005 | Lat et al. |
| 6,969,039 B1 | 11/2005 | Diggle et al. |
| 7,077,612 B1 | 7/2006 | Diggle et al. |
| D539,638 S | 4/2007 | Franks |
| 7,326,855 B2 | 2/2008 | Moffatt |
| 7,410,137 B2 | 8/2008 | Diggle et al. |
| 7,546,987 B2 * | 6/2009 | Sinkoff ................... 248/68.1 |
| 7,896,296 B2 * | 3/2011 | Julian ................... F16L 3/127 248/547 |

FOREIGN PATENT DOCUMENTS

| | | | | |
|---|---|---|---|---|
| GB | 1403714 | * | 8/1975 | ............ F16L 3/04 |
| NL | 1001624 | * | 5/1997 | ............ F16L 3/04 |

* cited by examiner

CABLE FASTENER WITH HOOK STRUCTURE FOR SUPPORTING A CABLE

CROSS-REFERENCE TO RELATED APPLICATIONS

This application claims the benefit of U.S. Provisional Application No. 61/809,757, filed Apr. 8, 2013, incorporated herein in its entirety by reference.

STATEMENT REGARDING FEDERALLY-SPONSORED RESEARCH OR DEVELOPMENT

Not Applicable

BACKGROUND OF THE INVENTION

1. Field of Invention

The invention relates to fasteners for securing wire, cable, or the like to a surface, and more particularly, to a fastener having inwardly-facing hook structures allowing convenient securement of one or more wires, cables, or the like to a structure.

2. Description of the Related Art

Various fasteners, such as for example staples, nails, clips, brackets, or the like, exist for use in securing one or more wires, cables, cords, or the like (hereinafter "cables") to a surface. Such fasteners are commonly used, for example, to assist in holding one or more cables against the framing members of a building to assist in routing the cables throughout the building. In common installation of a cable throughout a building comprising wood or metal studs, the cable is typically held against a surface of a stud while staples are driven into the surface in overlying relationship to the cable, thereby securing the cable along the surface. Typically, such staples are placed approximately every three to five feet along each cable to be secured.

The above-described process of mounting a cable along a surface by holding the cable against the surface and driving overlapping staples along the length of the cable presents several disadvantages. For example, the process of individually driving each prong of a two-pronged staple into the surface in a desired location, while simultaneously holding the cable in the desired location, is cumbersome. Furthermore, in the event one or more prongs of the staple contact the cable as they are driven into the surface, such prongs may damage the cable, such as for example by shearing or otherwise damaging the sheathing of the cable, by damaging or exposing the wiring of the cable beneath the sheathing, or by contacting the wiring of the cable and establishing electrical communication with the wiring of the cable. Such events may lead to risk of electrical failure of the cable, injury or damage due to electric shock from the wiring of the cable, and/or electrical fire in the building in which the cable is installed. In the event a hammer or other such tool is used to drive the staple, and in the event a user misses contacting the staple with the hammer, impact to the cable or surface may occur, thereby damaging the cable or surface. Moreover, when a cable is held in compression between a surface and a central portion of a staple, pressure exerted on the cable by the staple and the surface may further damage the cable. For example, in the event the cable is dragged along its length, such staples may shave off portions of the sheathing of the cable, thereby further exposing the inner wiring of the cable.

As an alternative to the above-discussed staples, various designs of plastic clips have been used to secure cables against surfaces, wherein a plurality of plastic clips are first fastened along the surface, and thereafter, a cable is positioned within a hook structure defined by the plastic clip. Typically, such hook structures open either outwardly from the surface or parallel along the surface, such that a cable can be more easily received within the hook structure. The use of such plastic clips is less likely to result in damage to the cable. However, when using such plastic clips, difficulty often arises in that the cable may be pulled from the outwardly-facing opening in the hook structure, thereby allowing the cable to become unfastened from the plastic clip if the cable is pulled. Furthermore, such plastic clips are often designed to secure a single cable, and cannot accommodate fastening of multiple cables using a single plastic clip. Moreover, such plastic clips are often, themselves, difficult and cumbersome to install along the surface to which the cable is to be mounted.

In light of the above, there is a need for a cable support which allows fastening of multiple cables to a surface, which is quick and convenient to install, and which minimizes the risk of damage to the cable and/or the risk of the cable becoming unfastened from the cable support.

BRIEF SUMMARY OF THE INVENTION

According to several features of the present general inventive concept, a cable support is disclosed for securing at least one cable along a surface. In certain embodiments, the cable support may include a central shaft portion having a forward end configured to be secured to the surface and a rearward end configured to extend from the surface. A stop may be disposed along the central shaft, in which the stop is sized and shaped to contact the surface and to limit advancement of the forward end into the surface. At least one hook structure may extend from the central shaft portion rearward end and curve toward the central shaft portion forward end. The hook structure may terminate sufficiently rearward of the stop that at least one cable may be received between the hook structure and the surface when the stop contacts the surface.

In certain embodiments, a first hook structure and a second hook structure may be provided, and the first and second hook structures may extend along opposite sides of the central shaft portion. In certain embodiments, each hook structure may define a recurved shape, in which the hook structure may have a rearward portion extending outwardly from the central shaft portion, a central portion curving inwardly toward the central shaft portion and forward toward the forward end, and a forward portion curving forward toward the forward end and outwardly from the central shaft portion. Each the hook structure rearward portion may extend substantially perpendicularly from the central shaft portion rearward end. The recurved shape of each hook structure may define an inwardly curved portion configured to at least partially restrict access to and from a void defined between the hook portion and the central shaft portion.

In certain embodiments, the stop may consist of an elongated member disposed along the central shaft portion rearward of the forward end portion and extending substantially perpendicular to the central shaft portion. The central shaft portion forward end may define an elongate shaft having a tapered end. In certain embodiments, the central shaft portion forward end may define a plurality of annular ridges extending in side-by-side relationship to one another along a length of the forward end. In other embodiments, the central shaft portion forward end may define an outwardly threaded surface. In still other embodiments, the central shaft forward end may define a plurality of barbs projecting outwardly and rearwardly of the central shaft.

The cable support may further include a coating provided over exterior surfaces of at least the hook portions and the central shaft portion rearward of the stop. The coating may be fabricated from a substantially non-conductive material, such as for example a polymer material. In certain embodiments, the coating may be provided over all exterior surfaces of the cable support.

In one embodiment constructed in accordance with several features of the present general inventive concept, the cable support may comprise an elongated central shaft portion having a forward end, an opposite rearward end, and a through opening defined along a length thereof. A stop may be defined by the central shaft forward end, in which the stop is sized and shaped to contact and abut the surface. The through opening may have a first end opening to an exterior surface of the stop. First and second hook structures may extend from opposite sides of the central shaft portion rearward end and curve toward the central shaft portion forward end. Each of the hook structure may terminate sufficiently rearward of the stop that at least one cable may be received between the hook structure and the surface when the stop abuts the surface.

In certain embodiments, a fastener may be received within the through opening for securing the stop in abutment with the surface. In several embodiments, the fastener may be a pin fastener or a threaded fastener. For example, in one embodiment, the fastener may be a nail of sufficient length to extend from the central shaft rearward end through the through opening and beyond the stop.

According to several features of the present general inventive concept, the central shaft portion may define a pair of shoulders, each shoulder formed on an opposite side of the central shaft portion at an interface between the forward and rearward ends of the central shaft portion. Each hook portion may have an interior surface defining an inward protrusion extending toward, but separated slightly from, one of the shoulders, each inward protrusion cooperating with a corresponding shoulder to at least partially restrict access to and from an interior of the hook portion defined rearward of the protrusion and shoulder between the hook portion and the central shaft portion. In certain embodiments, each hook portion may be capable of slight flexure to allow receipt of at least one cable between the inward protrusion and the shoulder and into the interior of the hook portion.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
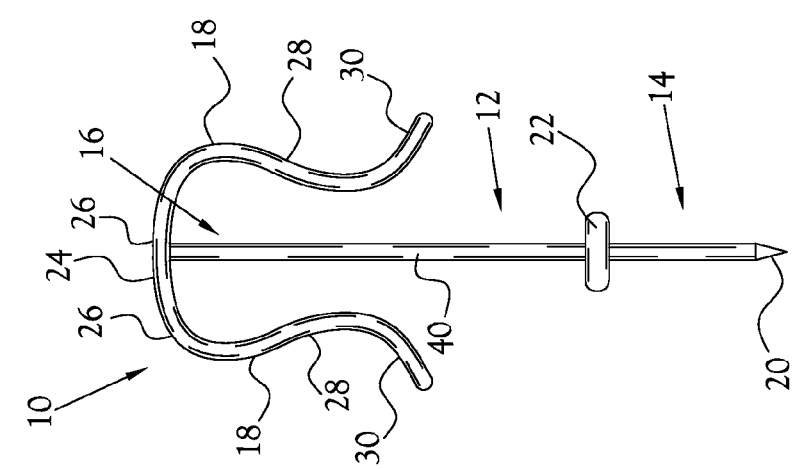
FIG. 1 is a plan view of one embodiment of a cable support constructed in accordance with several features of the present general inventive concept.
Figure 4:
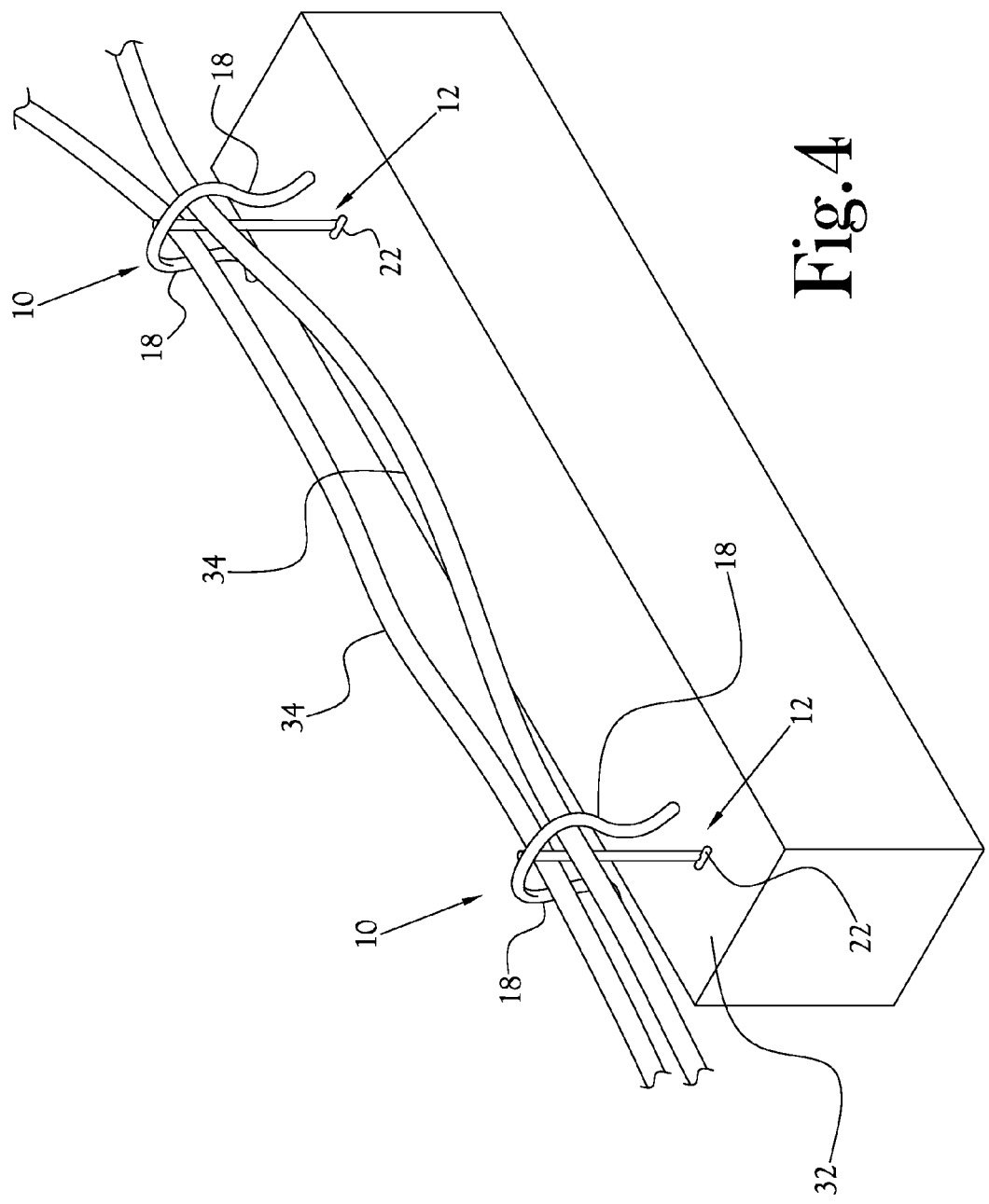
FIG. 4 is a perspective view of a support structure having multiple cable supports secured thereto, the cable supports having cables received therein.

Various embodiments of a cable support constructed in accordance with several features of the present general inventive concept are described herein and illustrated in the accompanying figures. With reference to FIG. 1, one embodiment of a cable support, constructed in accordance with several features of the present general inventive concept, is identified at 10. The cable support 10 includes generally a substantially straight, elongate central shaft portion 12 having a forward end 14, which is configured to be secured to a surface, and a rearward end 16. As will further be discussed below, a plurality of inwardly-facing hook portions 18 are secured to the rearward end 16. Each hook portion 18 is configured to receive one or more portions of one or more cables therein, such that the cables are secured adjacent the central shaft portion 12. According to certain features of the present general inventive concept, in certain embodiments, the hook portions 18 terminate rearward of the forward end 14 to define a rearward offset to allow the cables to be received within the hook portions 18 after the forward end 14 is secured to a surface. In certain embodiments, the hook portions 18 are further configured to allow removal of the cables from within the hook portions 18 absent disengagement of the forward end 14 from the surface.

In several embodiments, the forward end 14 of the central shaft portion 12 of the cable support 10 defines suitable features to assist in allowing the forward end 14 to be secured to a surface. For example, in the embodiment of FIG. 1, the forward end 14 defines a tapered point 20. In the illustrated embodiment, the remainder of the forward end 14 defines a substantially smooth elongate shaft, such that the forward end 14 resembles the driving end of a nail, spike, or other such pin fastener. In other embodiments, the forward end 14 defines a plurality of annular ridges or rings extending in side-by-side relationship to one another along a length of the forward end 14, such that the forward end 14 resembles the driving end of a ringed nail. In other embodiments, the forward end 14 portion of the central shaft portion 12 defines an outwardly threaded surface, such that the forward end 14 may resemble a screw, bolt, or other such threaded fastener. In still other embodiments, the forward end 14 portion of the central shaft portion 12 defines a plurality of outwardly and rearwardly projecting barbs 50 (see FIG. 7) which assist in limiting retraction of the forward end 14 from within a surface once the forward end 14 is driven into the surface. Those skilled in the art will recognize other features which may assist in allowing the forward end 14 of the central shaft portion 12 to be secured to a surface, and such features may be used without departing from the spirit and scope of the present general inventive concept.

In the embodiment of FIG. 1, a stop 22 is disposed along the central shaft portion 12 rearward of the forward end portion 14. The stop 22 is of sufficient size and shape to impede, and preferably to altogether arrest, forward motion of the forward end portion 14 of the central shaft portion 12 into a surface upon contact of the stop 22 with the surface. In the illustrated embodiment, the stop 22 consists of a relatively short, but elongated, member which is secured to the central shaft portion 12 substantially perpendicular to the central shaft portion 12 rearward of the forward end portion 14. In other embodiments, the stop 22 consists of an annular disc which is fixed to, or integrally formed with, the central shaft portion 12 rearward of the forward end portion. In still other embodiments, the stop 22 may define one or more forwardly-projecting barbs (not shown) which assist in establishing a frictional connection between the surface and the stop 22, thereby assisting in limiting continued forward driving of the forward end portion 14 of the central shaft portion 12 into the surface.

The central shaft portion 12 is of a substantially rigid construction such that the forward end 14 may be driven into a surface, such as for example a wooden surface defined by a structural member. To this end, in various embodiments, the rearward end 16 of the central shaft portion 12 defines a head portion 24 which is shaped and oriented along the central shaft portion 12 to allow the head portion 24 to receive force from a drive tool and to transfer such force to the central shaft portion 12. For example, in the illustrated embodiment, the head portion 24 defines a substantially flat end surface of the central shaft portion 12 which extends generally normal to a length dimension of the central shaft portion 12, such that the head portion 24 may receive impact from a hammer or other impact drive device to drive the central shaft portion 12 forward. In another embodiment, the head portion 24 may define one or more slots along and end surface of the central shaft portion 12, such slot or slots being configured to receive a screwdriver head or other such rotary drive tool to allow rotary driving of the central shaft portion 12. Those skilled in the art will recognize numerous other shapes and configurations which may be embodied by the head portion 24 to allow for forward driving of the central shaft portion 12, and such shapes and configurations may be used without departing from the spirit and scope of the present general inventive concept.

Referring to FIG. 1, according to several features of the present general inventive concept, the cable support 10 includes at least one, and preferably two, hook portions 18 which extend on opposite sides of the central shaft portion 12. Each hook portion 18 defines a rearward hook portion 26 which projects outwardly from the length dimension of the central shaft portion 12, a central hook portion 28 which curves both inwardly toward the central shaft portion 12 and forward toward the forward end 14, and a forward hook portion 30 which curves both forward toward the forward end 14 and outwardly from the central shaft portion 12. Thus, each hook portion 28 defines a "recurve" shape which opens forwardly toward the forward end 14 of the central shaft portion 12. In several embodiments, the rearward hook portion 26 projects substantially perpendicular to, or at a slight forward angle to, the length dimension of the central shaft portion 12, such that the head portion 24 of the central shaft portion 12 defines a rearmost feature of the cable support 10. In several embodiments, each forward hook portion 30 terminates at a distance outward from the central shaft portion 12 substantially equal to the distance of furthest extent of the rearward and central hook portions 26, 28 from the central shaft portion 12. Furthermore, in several embodiments, each forward hook portion 30 terminates at a distance sufficiently rearward of the forward end portion 14 and stop 22 so as to allow receipt of at least one cable between the forward hook portion 30 and the surface when the forward end 14 is driven into the surface.

Figure 3:
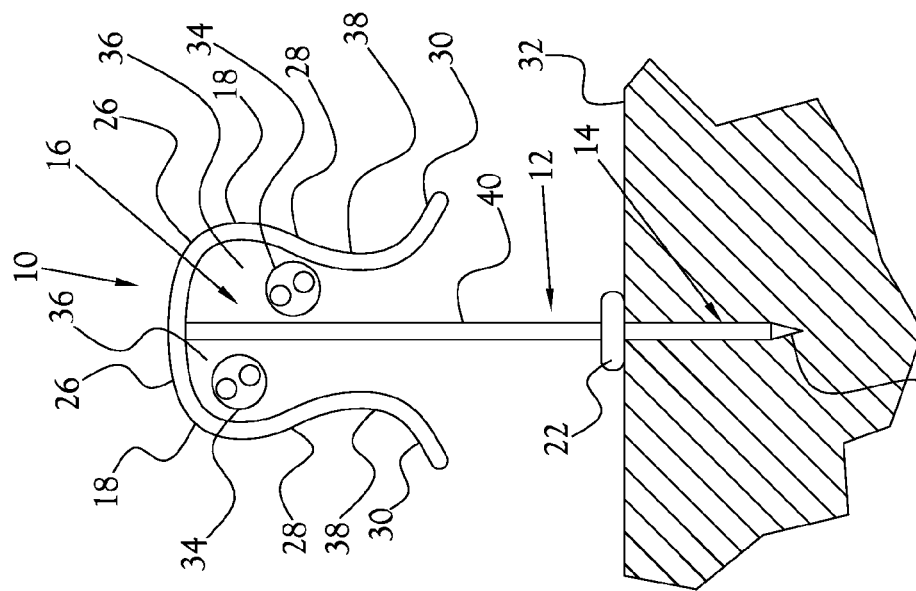
FIG. 3 is a cross-sectional view of a support structure having a cable support secured thereto, the cable support having cables received therein.
Figure 2:
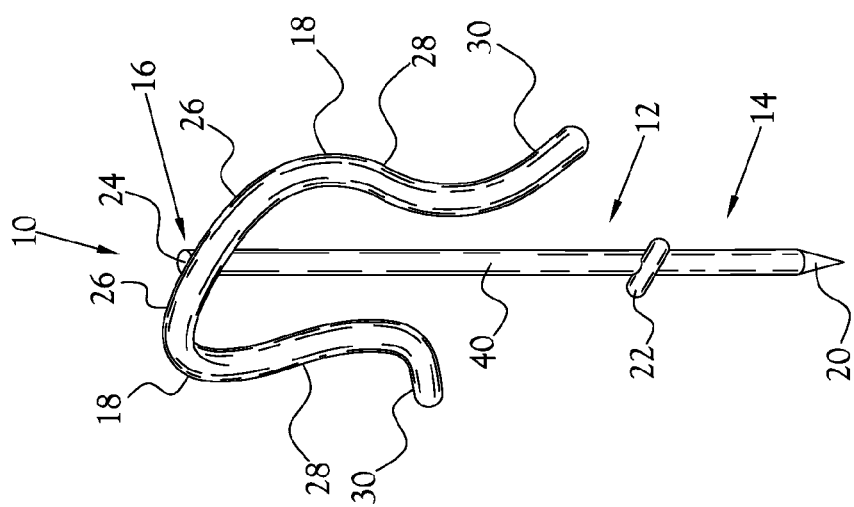
FIG. 2 is a perspective view of the cable support of FIG. 1.

As shown in FIG. 3, in use, the forward end 14 of the cable support 10 may be driven into a surface 32, such as a wooden, plaster, or other such surface of a structure. Thereafter, portions of one or more cables 34 may be received between the surface 32 and the forward hook portion 30 of one of the hook structures 18, pushed rearward between the forward hook portion 30 and the central shaft portion 12, and received within the void 36 defined between the rearward and central hook portions 26, 28 and the central shaft portion 12. To this end, the inwardly curved portion 38 of the hook portion 18 at the interface between the central and forward hook portions 28, 30 serves to at least partially restrict access to and from the void 36 defined between the rearward and central hook portions 26, 28 and the central shaft portion 12, thereby assisting in retaining the cable 34 within the void 36. In the present embodiment, the central shaft portion 12 and the two hook portions 18 of the cable support 10 are integrally formed with one another, and as noted above, are constructed of a substantially rigid material, such as for example iron, steel, aluminum, or the like. In this embodiment, the inwardly curved portion 38 of the hook portion 18 is separated from the central shaft portion 12 a sufficient distance to allow the cable 34 to slide snugly between the inwardly curved portion 38 and the central shaft portion 12, so as to establish a frictional connection, similar to a snap fit, of the cable 34 within the void 36. Once received therein, the cable 34 is frictionally retained within the void 36 sufficiently that the cable 34 will not fall of its own accord from within the void 36. However, the cable 34 may nonetheless be removed from within the void 36 by pushing the cable from within the void 36 along the central shaft portion 12 toward the forward end 14. In another embodiment, the hook portions 18 of the cable support 10 are capable of slight flexure sufficient to allow a cable 34 having a cross-sectional diameter which is wider than the distance between the inwardly curved portion 38 and the central shaft portion 12 to be slid between the inwardly curved portion 38 and the central shaft portion 12 and into the void 36.

In several embodiments, exterior surfaces of the cable support 10 rearward of the stop 22 may be fabricated from a material which renders them substantially non-conductive to electricity. For example, in the illustrated embodiment, the cable support 10, including a central shaft portion 12 and two hook portions 18 which are integrally formed with one another, is fabricated primarily from stainless steel. In this embodiment, a coating 40 is provided over exterior surfaces of the hook portions 18 and the central shaft portion 12 rearward of the stop 22. The coating is fabricated from a substantially non-conductive material, such as for example polymer, rubber, or the like. In other embodiments, a coating 40 may be provided over all exterior surfaces of the cable support 10. Those skilled in the art will recognize other configurations for the coating 40 which may be used without departing from the spirit and scope of the present inventive concept. Furthermore, it will be recognized by one of skill in the art that inclusion of the coating 40 is not critical to accomplishing the present general inventive concept.

In the illustrated embodiment, the central shaft portion 12, hook portions 18, and stop 22 of the cable support 10 are each disposed in a relatively flat, planar relationship to one another.

It will be recognized that, in certain applications in which the cable support 10 is configured in such a planar fashion, a plurality of cable supports 10 may be provided in a stacked, overlying relationship with one another, such that the stack of cable supports 10 may be received within and fed through a feeding device of an automatic driving tool, such as for example a pneumatic nail gun or other similar device, in order to assist a user in rapid mounting of several cable supports 10 along a desired surface 32. Alternatively, each cable support 10 may be provided separately from other cable supports 10, such that a user may drive each cable support 10 into a desired surface 32 individually and through more conventional means as discussed above.

Figure 5:
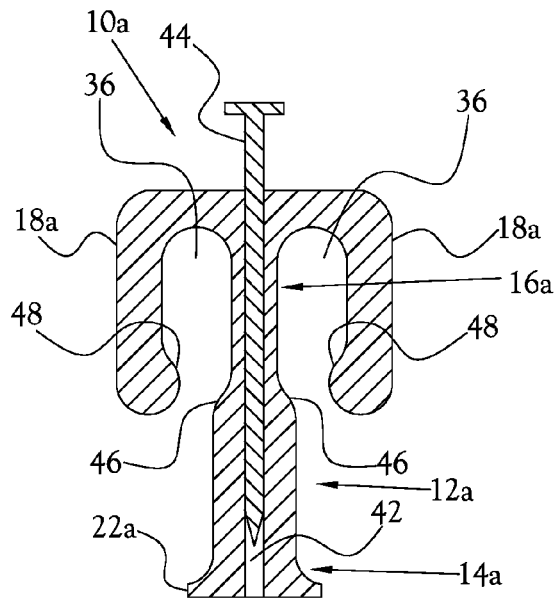
FIG. 5 is a cross-sectional view of another embodiment of a cable support constructed in accordance with several features of the present general inventive concept.
Figure 6:
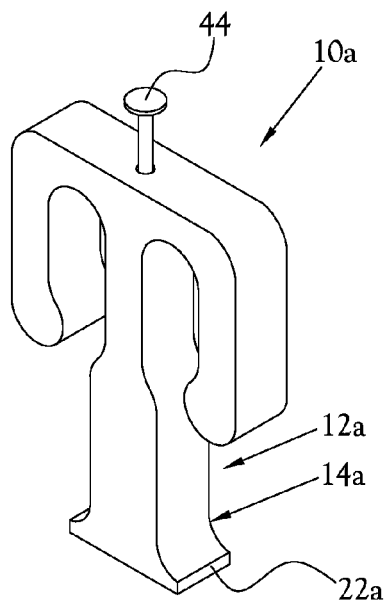
FIG. 6 is a perspective view of the cable support of FIG. 5.

FIGS. 5 and 6 illustrate another embodiment of a cable support 10a constructed in accordance with several features of the present general inventive concept. In the embodiment of FIGS. 5 and 6, the cable support 10a is defined by a bracket which is fabricated from a substantially rigid material, such as for example polymer, resin, or the like, and which is adapted to receive a traditional pin or screw fastener 44 therein to secure the bracket to a surface 32. More specifically, in the illustrated embodiment, the cable support 10a includes a central shaft portion 12a which defines a central elongate through opening 42 extending along the length dimension of the central shaft portion 12a and opening to the forward and rearward ends 14a, 16a of the cable support 10a. The through opening 42 is sized and shaped to receive snugly therein an elongated fastener 44, such as for example a nail, pin, screw, bolt, or similar fastener having sufficient length that the fastener 44 may extend from the rearward end 16a of the central shaft portion 12a, through the central shaft portion 12a and protrude forwardly of the forward end 14a. Thus, in this embodiment, the forward end 14a of the cable support 10a is configured to abut the surface 32, while a forward portion of the fastener 44 may extend forward of the forward end 14a to secure the cable support 10a to the surface 32. In the illustrated embodiment, the forward end 14a defines a stop 22a which consists essentially of a widened portion of the central shaft portion 12a that defines a flat end surface at the forward end 14a of the central shaft portion 12a. The stop 22a assists in abutting the cable support 10a in a substantially perpendicular orientation against the surface 32 prior to driving the fastener 44 through the opening 42 and into the surface 32.

In the embodiment of FIGS. 5 and 6, the rearward end 16a of the central shaft portion 12a is tapered slightly as compared to the forward end 14a, such that a shoulder 46 is formed on each opposite side of the central shaft portion 12a at an interface between the forward and rearward ends 14a, 16a. In this embodiment, each interior surface of each hook portion 18a defines an inward protrusion 48 extending toward, but separated slightly from, a cooperating shoulder 46. Thus, for each hook portion 18a, the inward protrusion 48 and corresponding shoulder 46 cooperate to at least partially restrict access to and from the void 36 defined rearward of the protrusion 48 and shoulder 46, between the hook portion 18a and the central shaft portion 12a. In several embodiments, fabrication of the cable support 10a from a polymer, resin, or like material allows the hook portions 18a of the cable support 10a to exhibit greater flexibility than the fastener 44, and thus, allow greater ease of receipt of one or more cables 34 within the hook portions 18a of the cable support 10a.

Figure 7:
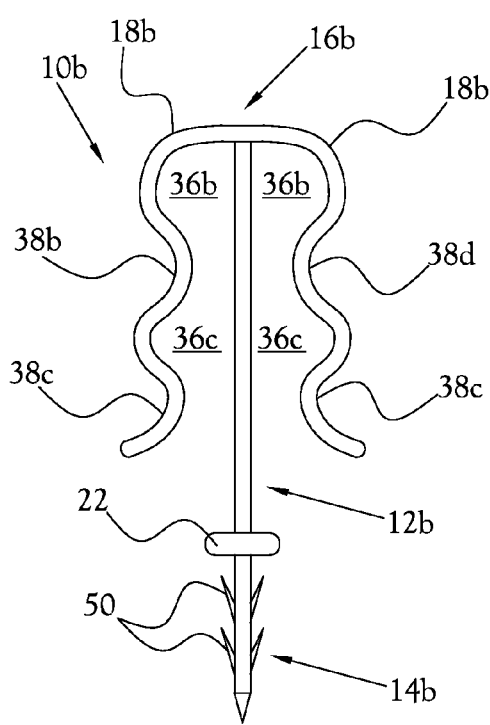
FIG. 7 is a plan view of another embodiment of a cable support constructed in accordance with several features of the present general inventive concept.
Figure 8:
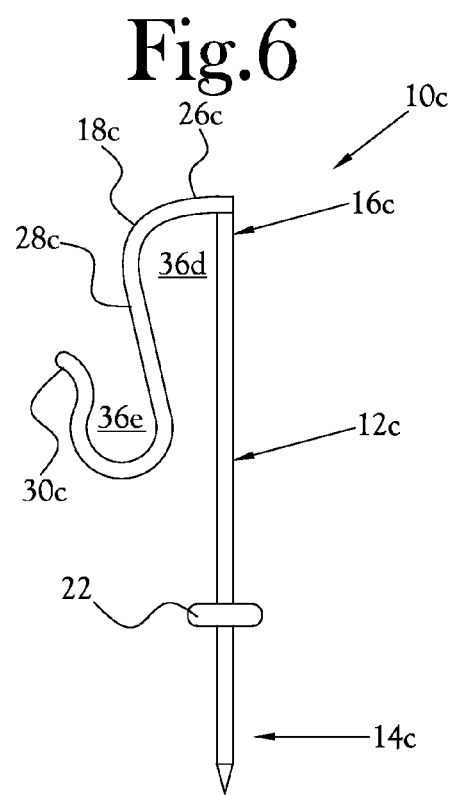
FIG. 8 is a plan view of another embodiment of a cable support constructed in accordance with several features of the present general inventive concept.

FIGS. 7 and 8 illustrate two additional embodiments of the cable support 10b, 10c, each constructed in accordance with additional features of the present general inventive concept. In the embodiment of FIG. 7, additional recurve shapes are defined by each hook portion 18b, such that a plurality of alternating inwardly curved portions 38b, 38c and voids 36b, 36c, are defined by each hook portion 18b along the central shaft portion 12b. In this embodiment, a cable 34 may be received within the first void 36c defined between a hook portion 18b and the central shaft portion 12b slightly rearward of the first inwardly curved portion 38c of the hook portion 18b by placing the cable 34 forward of the hook portion 18b and sliding the cable 34 between the first inwardly curved portion 38c and the central shaft portion 12b as discussed above. Thereafter, the cable 34 may be received within the second void 36b defined between the hook portion 18b and the central shaft portion 12b slightly rearward of the second inwardly curved portion 38b by further sliding the cable between the second inwardly curved portion 38b and the central shaft portion 12b, thus allowing additional cables 34 to be received within the first void 36c. In this manner, multiple cables may be held by each hook portion 18b, while simultaneously keeping each cable slightly separated from one another.

In the embodiment of FIG. 8, each hook portion 18c defines a rearward hook portion 26c which projects axially outwardly from the length dimension of the central shaft portion 12c, a central hook portion 28c which curves both inwardly toward the central shaft portion 12c and forward toward the forward end 14c, and a forward hook portion 30c which curves outwardly from the central shaft portion 12c and rearward toward the rearward end 16c of the central shaft portion. Thus, in the embodiment of FIG. 8, a pair of voids 36d, 36e are defined by each hook portion 18c, a first void 36d being defined along an inner surface of each hook portion 18c between the hook portion 18c and the central shaft portion 12c, and a second void 36e being defined along an outer surface of each forward hook portion 30c.

Figure 9:
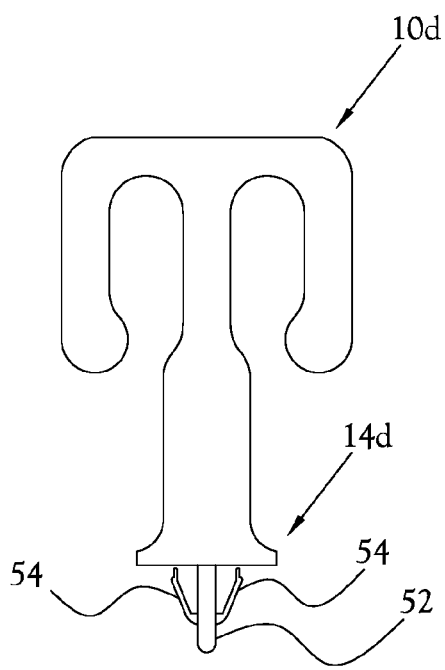
FIG. 9 is a plan view of another embodiment of a cable support constructed in accordance with several features of the present general inventive concept.

It will be recognized that numerous types of fasteners exist which are suitable for securing the forward end 14 of the cable support 10 to a surface 32. To this end, FIGS. 9-12 illustrate several additional embodiments of the cable support 10d-10g, each of which defines a different fastener for securing the forward end of the support to a surface. In the embodiment of FIG. 9, the cable support 10d defines a pin 52 extending forwardly of the forward end 14d. A pair of resiliently flexible tabs 54 extend from a forward end of the pin 52 outwardly from the pin 52 and rearward toward the forward end 14d, terminating slightly forward of the forward end 14d. Thus, as the pin 52 and associated tabs 54 are inserted into an opening in a thin layer of material, such as for example sheet metal or the like, in which the opening is sized slightly smaller in diameter than the span of the tabs 54, the tabs 54 may flex inwardly toward the pin 52 to allow the fastener to be received through the opening. Thereafter, the tabs 54 may return to their original outward configuration, thereby locking the fastener into the opening and securing the forward end 14d against the thin layer of material.

Figure 10:
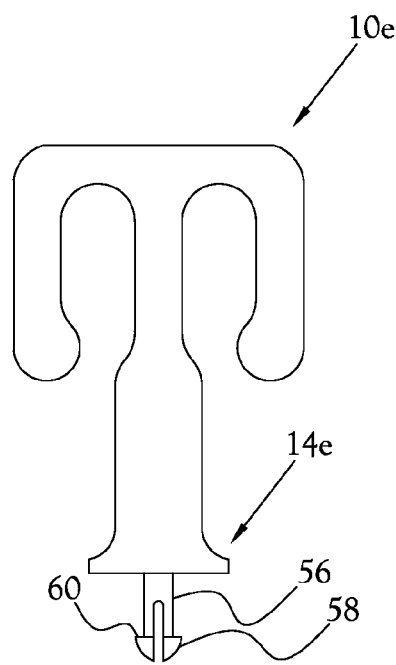
FIG. 10 is a plan view of another embodiment of a cable support constructed in accordance with several features of the present general inventive concept.

In the embodiment of FIG. 10, the cable support 10e defines a pin 56 which extends forwardly from the forward end 14e. The pin 56 is partially bifurcated along a length thereof and defines an outwardly flared forward end 58 defining a rearward lip 60. Thus, upon insertion of the forward end 58 into an opening in a thin layer of material in which the opening is sized slightly smaller in diameter than the span of the lip 60, the bifurcated portion of the pin 56 may flex inwardly to allow the forward end 58 to be received through the opening. Thereafter, the bifurcated portion of the pin 56 may return to its original configuration, thereby locking the forward end 58 of the fastener into the opening and securing the forward end 14e of the cable support 10e to the material.

Figure 11:
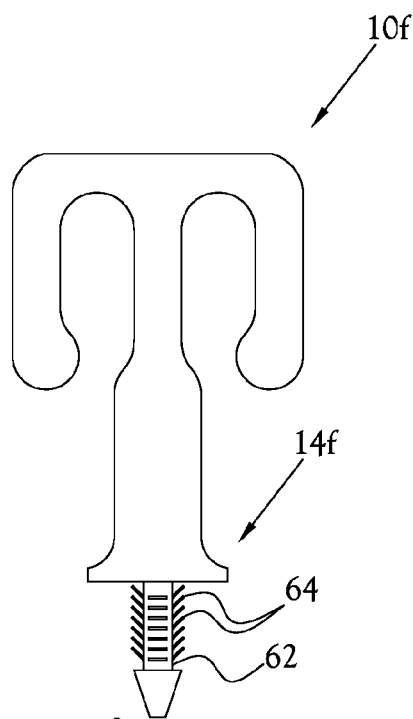
FIG. 11 is a plan view of another embodiment of a cable support constructed in accordance with several features of the present general inventive concept.
Figure 12:
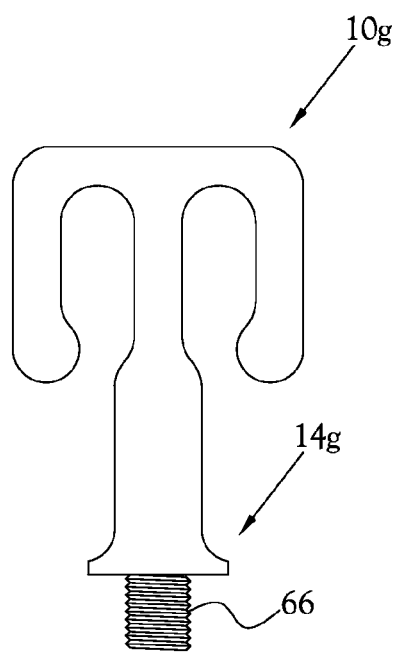
FIG. 12 is a plan view of another embodiment of a cable support constructed in accordance with several features of the present general inventive concept.

FIG. 11 illustrates a cable support 10f which defines a pin 62 projecting forwardly of the forward end 14f of the cable support 10*f*. In the embodiment of FIG. 11, the pin 62 defines a plurality of outwardly and rearwardly projecting tabs 64 disposed along the length of the pin 62. Similarly to the embodiment of FIG. 9, the tabs 64 may flex rearwardly and inwardly toward the pin 62 to allow the pin 62 to be inserted into an appropriately sized opening, and thereafter may provide resistance to removal of the pin 62 from within the opening. In the embodiment of FIG. 12, an outwardly-threaded bolt 66 projects from a forward end 14*g* of the cable support 10*g*. Thus, the bolt 66 may be secured to an inwardly-threaded opening of similar size to the bolt 66, thereby allowing the bolt 66 to secure the cable support 10*g* to a surface. Those of skill in the art will recognize other fastener devices which may also be used without departing from the spirit and scope of the present general inventive concept.

From the foregoing description, it will be recognized that a cable support 10 is provided which allows for fastening of one or more cables to a surface, which is quick and convenient to install, and which minimizes the risk of damage to the cable, the risk of electrical shock associated with an uninsulated cable support structure, and the risk of the cable becoming unfastened from the cable support. While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A cable support for securing at least one cable along a surface, said cable support comprising:
   a central shaft portion having a forward end configured to be secured to the surface and a rearward end configured to extend from the surface;
   a stop disposed along said central shaft portion, said stop being sized and shaped to contact the surface and limit advancement of said forward end into the surface; and
   a first hook structure and a second hook structure, said first and second hook structures extending along opposite sides of said central shaft portion, each said hook structure extending from said central shaft portion rearward end, curving toward said central shaft portion forward end, and terminating rearward of said stop to define a rearward offset between said hook structure and said stop, each said rearward offset being sized to allow receipt of at least one cable therein when said forward end is secured to the surface with said stop contacting the surface, each said hook structure having a rearward portion extending outwardly from said central shaft portion, a central portion curving inwardly toward said central shaft portion and forward toward said forward end, and a forward portion curving forward toward said forward end and outwardly from said central shaft portion, each said hook structure rearward portion extending substantially perpendicularly from said central shaft portion rearward end;
   whereby when said forward end is secured to the surface with said stop contacting the surface, at least one cable may be received within said rearward offset between said hook structure and the surface and inserted between said hook structure and said central shaft portion, thereby securing the cable along the surface.

2. The cable support of claim 1, said stop consisting of an elongated member disposed along said central shaft portion rearward of said forward end and extending substantially perpendicular to said central shaft portion.

3. The cable support of claim 1, said central shaft portion forward end defining an elongate shaft having a tapered end.

4. The cable support of claim 3, said central shaft portion forward end defining a plurality of barbs projecting outwardly and rearwardly of said central shaft portion.

* * * * *